United States Patent [19]

Jakobsen

[11] 4,196,039

[45] Apr. 1, 1980

[54] APPARATUS FOR FASTENING A STABILIZING ARRANGEMENT ON A CONTAINER

[75] Inventor: Kjell M. Jakobsen, Hjallese, Denmark

[73] Assignee: Aktiebolaget Platmanufaktur AB, Malmo, Sweden

[21] Appl. No.: 928,539

[22] Filed: Jul. 27, 1978

Related U.S. Application Data

[63] Continuation-in-part of Ser. No. 793,737, May 4, 1977, abandoned.

[30] Foreign Application Priority Data

May 10, 1976 [SE] Sweden ............................. 7605265

[51] Int. Cl.² ...................... B32B 31/00; B23K 1/06
[52] U.S. Cl. ................................. 156/580.1; 228/1 R
[58] Field of Search ................ 156/580.1, 73.1, 556; 220/69; 228/110, 1 R; 215/1 C

[56] References Cited

U.S. PATENT DOCUMENTS

| | | | |
|---|---|---|---|
| 3,494,817 | 2/1970 | Whitecar | 156/580.1 |
| 3,605,241 | 9/1971 | Fish | 156/580.1 |
| 3,616,050 | 10/1971 | Schrotz | 156/556 |
| 3,623,926 | 11/1971 | Sager | 156/73.1 |

OTHER PUBLICATIONS

Branson Ultrasonic Assembly Bookset, p. 5, S-900, 1972, Branson Sonic Power Co., Danbury, Connecticut.

*Primary Examiner*—Douglas J. Drummond
*Attorney, Agent, or Firm*—Hane, Roberts, Spiecens & Cohen

[57] ABSTRACT

A container assembly comprising a container of plastic material adapted for receiving a liquid and including a bottom of convex shape in the central portion of which the material is highly oriented. A stabilizing foot supports the container and for this purpose is welded to the container in the central portion of the bottom thereof whereat the material is highly oriented. The foot includes an annular projection extending downwardly from the portion welded to the container. The projection is hollow and forms an annular support foot including a rim which extends upwardly from the projection into smooth peripheral sliding engagement with the bottom of the container. The support foot is welded to the container while the middle portion of the projection is held against the middle portion of the bottom of the container.

9 Claims, 18 Drawing Figures

APPARATUS FOR FASTENING A STABILIZING ARRANGEMENT ON A CONTAINER

CROSS-RELATED APPLICATION

This application is a continuation-in-part of Ser. No. 793,737 filed May 4, 1977 now abandoned.

FIELD OF THE INVENTION

The present invention relates to apparatus for fastening a stabilizing arrangement, for example a foot, on a container, for example, a bottle. The invention is suitable for use where the stabilizing arrangement and also the container consist of plastic material.

The present invention is particularly suited to a container particularly for liquids under pressure, e.g. for carbonated beverages, where the containers are mainly made of a plastic material, and especially to the arrangement in such containers of an outside, stabilizing device, which is to make up the foot of the container.

BACKGROUND

There is great interest in the ability to make containers of plastic material for storing beverages, for example. This interest is due, among other factors, to the desire to reduce the weight of the packing used, as far as this is possible, and at the same time to utilize the good properties of plastic material, for example in respect of impact strength. The types of plastic material used for for this purpose are however, relatively expensive, so that in connection with the consumption of material it is obviously also necessary for reasons of economy to employ the smallest possible wall thickness of containers used. In order to withstand the loads to which the material packed in the containers is subjected, the parts of the containers which are subjected to these stresses, for example the bottom of a bottle, must be so constructed as to make the most effective possible use of the strength of the material. This is particularly important when containers of plastic material are used to store materials under pressure, for example, beverages containing carbon dioxide. Because of the requirements explained above, this means that the bottom of a container should have a mainly circular shape.

For a container, for example a bottle, for storing materials, it is an essential requirement that it should be possible for the container to be stored in an upright position. With a container having a bottom of circular shape this is obviously simply impossible. This has in turn the consequence that containers of the kind described here are equipped with supporting arrangements, for example feet. Various types of feet have been used, being either parts projecting from the bottom of the bottle or separate parts fixed to the containers. In the last-mentioned case these parts are applied to the container, for example, by snap engagement, riveting, or comparable methods.

The types of plastic which can be used at present within this field are mainly polyvinyl chloride (PVC), acetylonitrile (AN), ad polyethylene terephthalate (PET), and materials similar to these. The reason for this is that the materials in question have viable combinations of barring properties and properties of impact resistance, and that they are economical and meet existing requirements for use as packages for food articles.

In order to acquire the desired properties in containers made of the above-mentioned materials, the material in the wall of the container is usually stretched so that it is oriented. This orientation will increase the impact resistance of the material. The containers are often made, in principle, as cylinders, where one end surface is more or less spherical, whereas the other end surface is often replaced by a bottle-like opening. The reason for the spherical end surface is that the materials mentioned have the property in common that they are relatively expensive, and that from a financial point of view the walls of the containers will therefore have to be made relatively thin. As the materials are elastic a shape of the end surface is required which will expose the material to as little strain as possible. The result of the spherical bottom which is therefore used is that a container made in this way cannot stand on a plane surface, e.g. on a table.

The advantages which are moreover a result of the use of these materials have brought about, however, that containers with spherical end surfaces have been equipped with supplementary devices so that the container has a standing surface. The solutions that have come forward can be divided into three groups:

According to the first group, the spherical end surface has been fitted with bulges of various shapes, so that the bulges form a kind of leg on the package.

In the second group the surface of the bottom, which is in principle spherical, has been dislocated inwards in its central part, so that the package can stand on the point between the extreme concave part of the spherical surface and the central inwards directed part of the bottom.

In the third group the containers are fitted with an outside stabilizing device which has the shape of a foot, so that the material in the outside stabilizing device is separated from the material in the container.

Containers which are made according to the characteristics of the first group mentioned above have the disadvantage that problems may arise in acquiring the necessary stability of deformation in the containers. Especially in connection with high temperatures the pressure in the containers can increase to such an extent that the legs are deformed to such a degree that the stability of the containers are reduced to an extent which is not desirable.

There is no doubt that the ability of the container to resist inside pressure can be increased by reducing the size of the legs, but this will only bring about the drawback that the standing surface of the container is so small already from the beginning that the stability of the standing container is much too small. Another drawback in connection with the containers discussed here is that they may be difficult to blow into the desired shape.

Containers made according to the second of the groups mentioned above will only have the required stability against inside pressure if the plastic material used is sufficiently stiff. Stiff plastic materials of the type mentioned above have the disadvantage, however, that they are brittle, and therefore such packages have reduced resistance to impacts, e.g. if they fall. The shape of the bottom mentioned will also entail that the standing surface is relatively small and that the stability of the containers is consequently lower than what is desired.

Finally, as far as the third group is concerned, it can be ascertained that it is usually provided with a foot made of an inexpensive material, in which the actual container is placed. The foot of the container is fastened to the container by means of some kind of snap connection. It may also occur that the foot is riveted mechanically to the package.

In the course of time, recycling of materials has gained more and more importance. This, no doubt, also is true for plastic materials. It is known that plastic materials may lose much of their good properties—the material may even become unfit for use—if it is contaminated by small quantities of another plastic material or contaminated by another material.

The usual procedure in connection with the manufacture of containers made of plastic is first to form a workpiece which is a tube that is closed at one end, which in the finished package is usually the bottom of the package. The workpiece is blown into the desired shape, e.g. that of a bottle. This method of manufacture means that there will be a thicker and less stretched part in the bottom of the finished package than in the other part of the package. This is usually the case in connection with the methods of manufacture used today. In certain cases, however, the mentioned central part can be prevented by using a flat, sheet-shaped workpiece for the manufacture of the container.

SUMMARY OF THE INVENTION

The present invention contemplates apparatus for fastening a separate member, which consists of a supporting arrangement, for example a foot on a container of plastic material.

According to the invention the supporting arrangement is welded to the container. The invention can be applied to combinations of plastic material in the supporting arrangement and container when the plastic material in the supporting arrangement and container are weldable. Examples of such plastic materials are polyethylene, polyethylene terephthalate, acrylonitrile, and polyvinyl chloride.

According to the invention, the stabilizing arrangement is guided into a position in which it lies against the container. The material of the stabilizing arrangement is thus pressed against the material of the container. According to one embodiment of the invention the inclination of the bottom of the container to become deformed during the fastening of the arrangement is compensated by subjecting the internal volume of the container to pressure. This embodiment is often suitable for use with thin-walled containers. As an alternative, the application of pressure is replaced by a mechanical holding-up means. A mandrel for transmitting energy, for example ultrasound, is brought into a position in which the mandrel gives up energy to the material of the stabilizing arrangement and of the container in a region which corresponds substantially to that where the stabilizing arrangement lies against the container. The stabilizing arrangement is thus welded to the container. When this has been done, the welded parts and the container together with the stabilizing arrangement fastened to it are cooled.

After the stabilizing arrangement and the container has been welded together, a bending moment is produced in the stabilizing arrangement by displacing the middle bottom portion of the stabilizing arrangement in relation to the other parts of the latter before the welding is carried out. This displacement is achieved by moving the middle bottom portion in the direction of the bottom of the container so that after application to the container a stabilizing arrangement disposed in this form presses the container with its upper edge.

An apparatus according to the invention for fastening stabilizing arrangements on containers consists of a supporting member which continuously receives the stabilizing arrangements in unison with the rate at which the stabilizing arrangements are to be welded to the containers. A gripping means acts on the containers in such a manner that each individual container lies against the stabilizing arrangement under the action of compressive forces when the stabilizing arrangement lies in the supporting means. An energy supply means, for example an ultrasonic welding means, is brought by driving means into contact with the material of the stabilizing arrangement and provides energy at the region of contact between the material of the stabilizing arrangement and the container. The materials are thereby heated and the stabilizing arrangement is welded to the container. If necessary, the container is given a stable shape during the course of the welding through the action of a holding-up means which assumes a position in which it lies against the inner surface of the container in the welding region, or by the action of a pressure application element which holds the internal volume of the container under increased pressure.

Two concentrically disposed rings are provided in the supporting element for the stabilizing arrangement. The outer ring preferably has a breaker-like appearance and is adapted to the outside dimensions of the stabilizing arrangement. In certain embodiments the ring is disposed on a number of relatively soft springs.

The inner ring has an inside diameter which is adapted to the outside diameter of a mandrel which supplies energy. In this arrangement it is made possible for the mandrel to slide through the ring for the purpose of bearing against a stabilizing arrangement when the latter rests against the inner ring.

When a stabilizing arrangement has been introduced into the supporting means, consequently the middle portion of its bottom rests against the upper surface of the inner ring and at the same time is centered in the supporting means by the outer ring. In an embodiment where the outer ring is suspended on springs, it is situated in an upper position in dependence on the action of the springs.

A gripping means acts in sequence on the containers in such a manner that they are brought into a position with their bottom parts disposed in the stabilizing arrangement. The latter more or less embraces the bottom part of the container. The gripping means then acts on the container in such a manner that the container is moved in the direction of the stabilizing arrangement. The middle portion of the bottom of the stabilizing arrangement is fixed in position in the supporting element with respect to the inner ring, whereas the outer parts of the stabilizing arrangement are displaced relative to the middle portion of the bottom through the action of the container. If necessary, this is permitted by the previously mentioned spring suspension of the outer ring. Through this displacement of the container, reliable contact is also obtained between the middle portion of the bottom of the container and the middle portion of the stabilizing arrangement.

In one embodiment of the invention, an arrangement simultaneously embraces the mouth portion of the container in such a manner that the latter forms a closed space. Pressure is applied to the interior of the container, whereby it is stabilized against mechanical displacement. The element used for embracing the mouth portion of the container preferably consists of the previously mentioned gripping element.

The previously mentioned assistance in the displacement of the container for a relative movement of the material of the stabilizing arrangement is preferably provided by the gripping element. In one embodiment the gripping element is displaced with a roller lying against a cam so that when a relative displacement occurs between the roller and the cam, the gripping element is displaced in the direction of the stabilizing arrangement.

With the stabilizing arrangement and the container fixed in relation to one another in the manner described in the previous paragraph, a mandrel is thereupon guided through the inner ring so as to come into contact with the material in the middle portion of the bottom, of the stabilizing arrangement for the purpose of supplying energy, for example, ultrasonic energy. Ultrasonic energy is applied to the material of the stabilizing arrangement and container, and the stabilizing arrangement is thus welded in this region to the bottom of the container. With the stabilizing arrangement and the container also fixed in relation to one another by external elements, the welded part is the cooled, the internal excess pressure (where applied) is relaxed or the holding-up means used is removed, whereupon the external fastening element is removed and the container together with the stabilizing arrangement welded to it is carried away from the production unit.

The inner ring is preferably mounted for sliding in the supporting element, so that the distance of the container in the axial direction between the upper surface of the inner ring and the upper surface of the outer ring is adjustable.

The relative displacement between the middle portion of the bottom of the stabilizing arrangement in relation to the remainder of the latter is effected in a alternative embodiment of the invention through the displacement of the inner ring, optionally in cojunction with the displacement of the outer ring.

The positioning of the individual stabilizing arrangement in the supporting element and also the displacement of the containers with or without the stabilizing arrangements can be effected in accordance with conventional techniques. Thus, for example, a suction means may be used to secure the stabilizing arrangement and a vacuum tube for bringing the completed containers to a storage site.

BRIEF DESCRIPTION OF THE DRAWINGS

The apparatus according to the present invention will be described below in connection with the accompanying drawings, in which.

DETAILED DESCRIPTION

Figure 1:
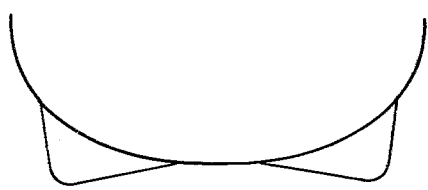
FIG. 1 is a diagrammatic sectional view of one embodiment of a container

The invention will next be described in conjunction with specific methods and apparatus for forming containers with attached stabilizing arrangements. According to the invention, an outer stabilizing device in the shape of a mainly cylindrical short part is arranged in connection with the bottom part of the container. This cylindrical part is made of the same material as the package, and it is melted or welded to the bottom of the package in its central, thicker part. The stabilizing device is fitted with a principally planar part, which in the combined package, which is made up of the container in combination with the stabilizing device, makes up the bottom surface of the combined package. The stabilizing device thus more or less surrounds the spherical part of the body of the container, and through welding together with the body of the container it makes up an integrated part of the body of the container. The stabilizing device is formed separately and it is connected with the body of the container primarily to an extent which results in a relatively small penetration into the material of the container body. This entails that the material forming the stabilizing device will never come into contact with the liquid that is stored in the container. This also entails that it is not necessary to manufacture the stabilizing device of a material which has not been used before, waste materials and material recycled from packages used before can be used. Thus, the invention makes it possible to meet all existing requirements to hygiene, and at the same time, through this invention, earlier used material can be used again.

First of all, the invention is directed towards the special group of materials which is here called polyethylene terephthalate. This type of material has the desired property that will produce containers with very high impact resistance, but because of its smaller degree of stiffness in proportion to the other materials mentioned it requires, in return, the earlier mentioned principally spherical shape of the bottom. However, by means of various additives, so-colled "impact modifiers", the two other types of material can have their impact resistance increased at the expense of their stiffness. This, in turn, will entail that even these types of material will acquire properties that make the invention adaptable for containers made of the materials in question. By polyethylene terephthalate and similar materials are meant materials such as polyethylene terephthalate, polyethylene-2,6 and 1,5-naphthalate, and copolymers of ethylene terephthalate, ethylene-isophthalate, and similar polymer plastics.

By similar materials an indicated in the two other main groups are meant in this description materials such as polymers made of monomers containing a nitrile group. By way of example of such monomers can be mentioned methacrylic nitrile and arcylic nitrile. Monomers which can be co-polymerized with the monomers that contain nitrile groups can also be used. Other applicable materials are of the type synthetic rubber material, e.g. polybutadiene, butadiene-styreneco-polymers, etc.

In connection with previously described methods for the manufacture of containers it can be pointed out that a considerably larger thickness of material is obtained in the central bottom part of the containers than in the cylindrical part of the containers. This, in turn, means that the material in this central bottom part is less stretched and thus less oriented, approximately to the same extent as it is thicker. The starting point for this reasoning is that the workpiece, from which the container is made, has by and large the same thickness in all parts.

The materials which are of current interest for the manufacture of containers of the type described here will lose, in connection with heating, their special properties, which are built into the material through its stretching. By the special properties is meant the orientation which is built into the material, and which will disappear if the material is heated to its melting point. At the same time, the melted condition in the material is necessary in order to obtain the welding together of the stabilizing device and the body of the container, which is required according to the invention. In order to lose as little as possible of the orientation which is built into the material the welding is performed in such a way that the heating of the material will penetrate as little as possible into the material. Furthermore, it takes place in the central part of the bottom of the container, where the material is thick and less stretched and therefore oriented only to a small degree.

The stabilizing device is made according to the methods which are employed within the plastic industry for the manufacture of similar products. For instance injection moulding, thermo moulding, or punching can be used. As basic material can be used both amorphous and stretched material, e.g. PET.

According to the above, the stabilizing device can consist of a body, in which the material is amorphous, and where the body is shaped by means of injection moulding. Furthermore, the body can be amorphous and made by means of thermo moulding, and in this way the basic material can, for instance, have the shape of a foil. Further, the body can be amorphous and shaped by means of mechanical deep pressing, where the basic material can, for example, have the shape of foil. The body can even be stretched and oriented and formed through deep pressing from a basic material, which can, for instance, have the characteristics of foil.

Instructions have been given above as to how the body forming the stabilizing device can be manufactured and which properties the material of this device may have as far as any orientation is concerned. As appears from the alternatives described, the construction of the body is relatively independent of the methods of manufacture. In addition to the methods mentioned for obtaining a body with amorphous or stretched material, other methods of manufacture can no doubt be applied without deviating for that reason from the idea of the invention. The material of the body can, for instance, be oriented even in the case where the body is obtained through thermo moulding.

Concerning the joining of the stabilizing device with the body of the container, this is made, as already mentioned, through some form of welding. Suitable methods of welding are friction welding or ultrasonic welding, but even thermo-welding may be used.

It has been possible to ascertain that both is connection with friction welding and with ultrasonic welding it is possible to join, amorphously, stretchedly, or crystallinely, PET both with bodies where the material is in a corresponding condition, and with bodies where the material is is one of the two other conditions.

In tests it has just as surprisingly turned out that both friction welding and ultrasonic welding can be performed directly between the material in the stabilizing device and the material in the body of the container without necessitating any hold-down at the inside of the body of the container. This later fact is of substantial importance, as containers of the type for which stabilizing devices according to the invention can be of current interest will often have a very small opening. The result of this is that a hold-down in connection with the welding would therefore be very difficult to arrange in practice. The small diameter of the opening will create certain problems when such a hold-down is to be placed down at the bottom of the container. The insertion of such a hold-down into a container will also create a risk of admitting infectious matter or other undesired objects into the container. This is of considerable importance when the container is used for storage of for instance food articles.

The stabilizing device is also made with a vertilation and draining hole in order that liquids shall not be able to collect in the body. The holes in question can, for example, be punched in connection with the manufacture of the stabilizing device, or they can also be made through a simple perforation. A stabilizing device according to the invention will thus create:

A stabilizing influence on the body of the container, which will have the effect that the ability of the body of the container to resist pressure from the inside will be increased, that the combined container, combined by the body of the container and the stabilizing device, will have a plane and relatively large standing surface, which makes it possible for the combined container to be relatively stable in an upright position, a sufficiently firm connection between the body of the container and the stabilizing device that they will not fall apart during the handling of the combined package, a forming of the bottom part of the combined container, which will not be destroyed if the filled package is subjected to a fall, and which is this way enables the composite package to remain fit for use in the way intended, even after such a free fall, a composite container, in which the consumption of material is at a minimum, and a constructive structure of the composite container which is adapted to conventional welding methods.

Figure 12:
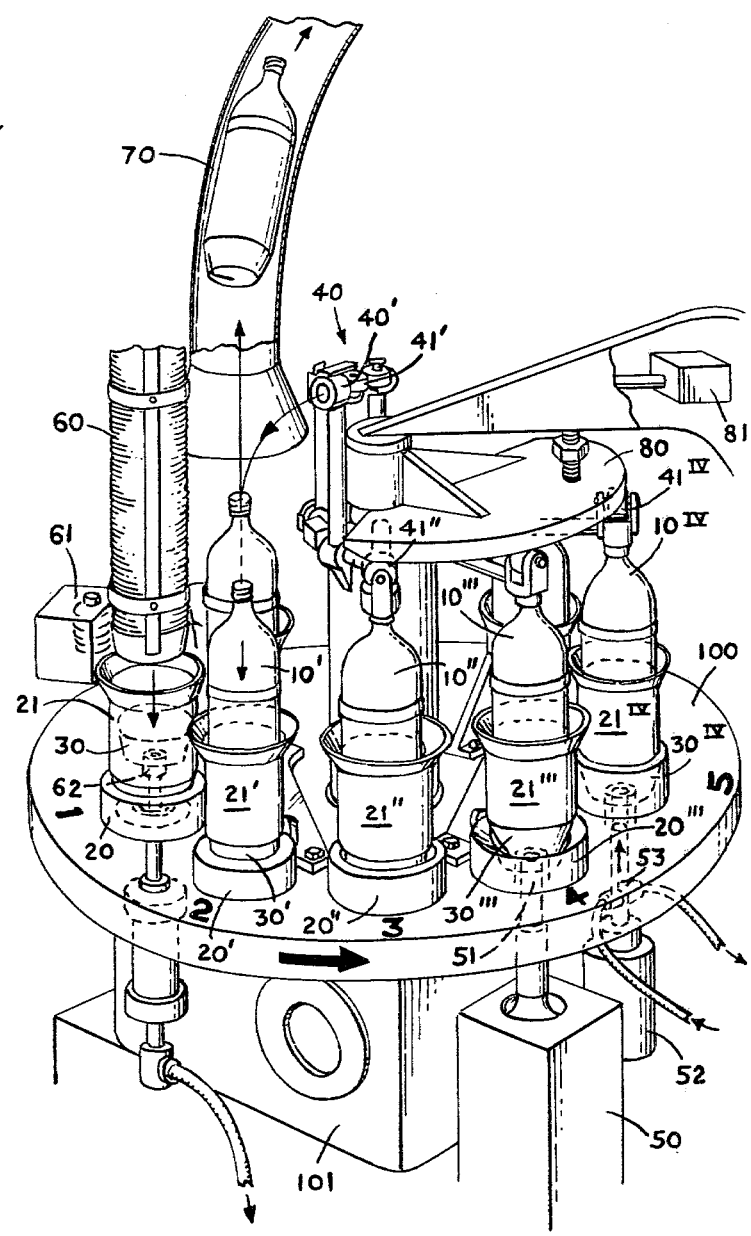
FIG. 12 is a front perspective view of apparatus in accordance with the invention for producing containers.

In FIG. 12 a plate 100 is mounted on a shaft driven by a mechanism 101. The plate is rotatable stepwise so as to assume fixed stopping positions. A number of supporting elements 20 are disposed on the plate. The supporting elements are adapted to the dimensions of stabilizing arrangements 30 which are to be joined to container 10. Control elements 21 adapted to the dimensions of the containers adjoin the supporting elements 20. An element 50 for supplying energy, for example for ultrasonic welding, preferably adjoins one of the positions for the supporting elements 20. The element 50 is equipped with a mandrel 51 which can be displaced from a bottom position lying under the plate 100 to an upper position in which the mandrel is situated in the supporting element 20. A cooling element 52 adjoins a downstream position for the supporting element 20. The cooling element is also provided with a mandrel 52 which can be moved between a position below the plate 100 and an upper position situated in the supporting element 20.

A gripping element 40 provided for each individual supporting element 20 is arranged to assume a position in which it secures the individual containers 10 on the supporting elements 20. In one embodiment of the invention, the gripping elements are connected to a pressure application means 81, which consists for example of a container of compressed air and is equipped with valves for connecting and disconnecting the gripping element to and from the pressure application means. The gripping elements are arranged to make sealing connection with the mouth portions of the containers, so that when the valve connected to the pressure application means is opened and excess pressure is produced in the containers.

A supporting disc 80 is arranged to cooperate with the gripping elements 40. In one embodiment the gripping elements 40 are each provided with a roller 41 lying against the supporting plate 80. The direction and shape of the supporting plate are so selected that when it performs a relative movement with respect to the supporting disc 80 the gripping element 40 is moved in the direction of the supporting elements 20.

The stabilizing arrangement is fed and the container with the stabilizing arrangement welded to it is removed with the aid of a magazine 60 for loose stabilizing arrangements, a feed means 61, for example a worm, and a suction element 62. The suction element 62 secures a stabilizing arrangement fed by the feed means and brings it into the desired position in the supporting element 20. The suction element 62 is movable between a position under the plate 100 and a position above the supporting means 20. The suction element 61 is common to all the supporting elements 20. Finished containers with stabilizing arrangements welded to them can be discharged with the aid of a suction discharge pipe 70, as shown in the drawing.

Figure 2A:
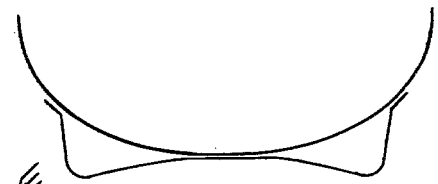
FIG. 2a shows a modified arrangement in which the stabilizing device is fitted with a supporting edge.
Figure 2B:
FIG. 2b shows how supporting devices of the embodiment shown in FIG. 2a can be nested into each other.
Figure 3:
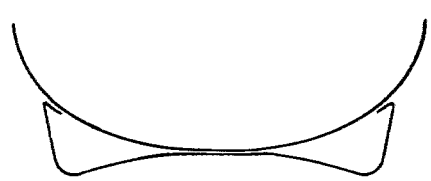
FIG. 3 shows an embodiment where the edge of the stabilizing device is bent towards the center of the device.
Figure 4:
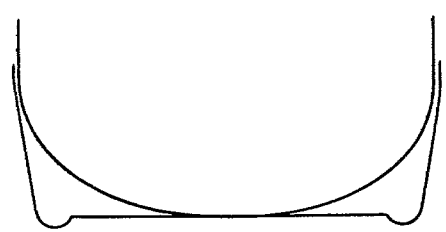
FIG. 4 shows an embodiment where a cylindrical part of the stabilizing device surrounds the bottom part of the body of the container.
Figure 5A:
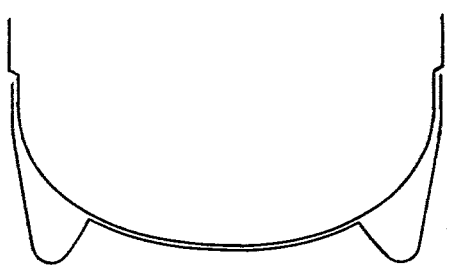
FIG. 5a shows an embodimment similar to FIG. 4, but where the body of the container is recessed inwards in the lower part.
Figure 5B:
FIGS. 5b–5e show various embodiments in accordance with FIG. 5a as to how the outside edge of the stabilizing device has been arranged.
Figure 5C:
Figure 5D:
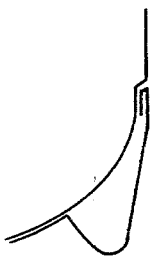
Figure 5E:
Figure 6:
FIG. 6 shows an embodiment with a planer bottom in the stabilizing device, before this is fixed to the body of the container.
Figure 7:
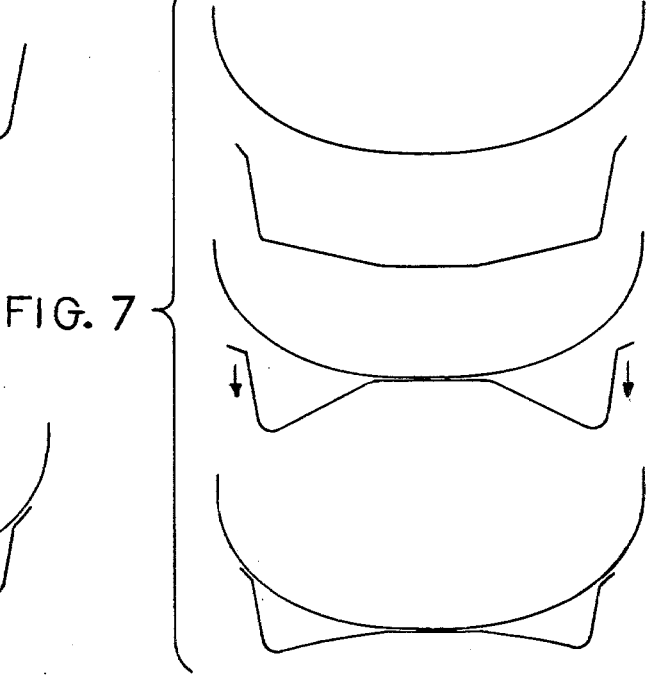
FIG. 7 shows an embodiment of the stabilizing device especially adapted for friction welding.
Figure 8:
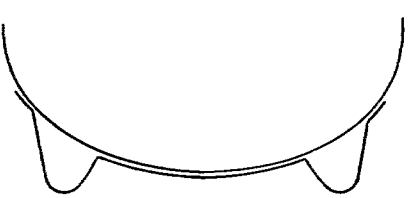
FIG. 8 shows an embodiment where the central part of the stabilizing device lies true against the convex bottom of the body of the container.
Figure 9:
FIG. 9 shows the stabilizing device arranged with a groove.
Figure 10:
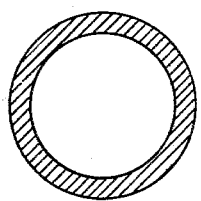
FIG. 10 shows the appearance in principle of a joint in connection with an embodiment according to FIG. 9.
Figure 11:
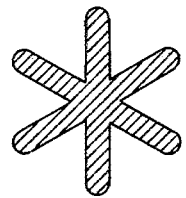
FIG. 11 shows examples of joints that are suitable for use in connection with ultrasonic welding.
Figure 13:
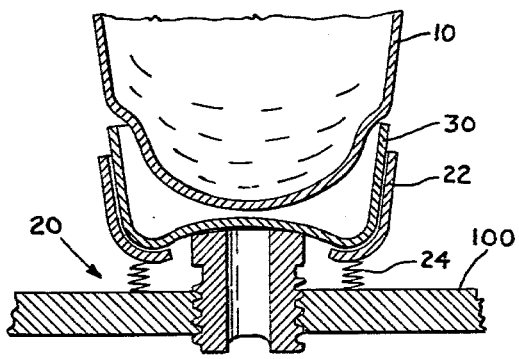
FIG. 13 is a sectional view of a detail illustrating the mounting of the element for welding the stabilizing arrangement to the container.

FIG. 13 shows in detail how the supporting elements 20 are mounted in one embodiment of the invention. The plate 100 and a mandrel can be seen in FIG. 2 the mandrel being either a mandrel 62 for supplying energy, for example, for ultrasonic welding, or a mandrel 53 for cooling. In addition, the bottom part of the container 10 is shown, as well as the stabilizing arrangement 30. In addition, there is also seen an outer ring 22, preferably of metal, and an inner ring 23. The outer ring is mounted on a plurality of springs 24, so that the ring can be moved between an upper position of rest some distance from the plate 100 and a lower position close to the plate. The inner diameter of the outer ring 20 is adapted to the outside diameter of the stabilizing arrangement 30, so that the outer ring lies against the stabilizing arrangements.

In the drawing, the inner ring 23 is joined to the plate 100. It is adjustable with respect to the plate 100, for example, by being screwed into the plate by means of a screwthread. The inside diameter of the ring enables the mandrel 51 or 53 to pass through it. It can also be seen from the drawing that the plate 100 also permits the passage of the mandrel. The upper surface of the inner ring lies approximately flush with the bottom surface of the outer ring 22.

FIG. 13 shows how the middle portion of the bottom of the container 10 is situated at a distance above the middle portion of the bottom of the stabilizing arrangement 30. This is the starting position for the container when the latter has first been brought into a position for welding to the stabilizing arrangement. In the following stage of the process, the container is acted on by forces which are directed towards the stabilizing arrangement, so that the container together with the outer parts of the stabilizing arrangement are displaced towards the plate 100. The middle portion of the bottom of the container 10 thus reaches a position in which the material of that portion is pressed against the material in the middle portion of the bottom of the stabilizing arrangement. Since the outer ring 22 is suspended on the springs 24, the ring 22 can follow the stabilizing arrangement in the movement just mentioned. The welding and cooling of the welded region are effected with the container and stabilizing arrangement lying in the position close to the plate 100.

The mode of operation of an arrangement according to the description given above is as follows:

With the aid of the feed means 61, the stabilizing arrangements are fed individually from the magazine 60 to the supporting elements 20. This takes place with the supporting elements 20 in the position designated position 1. The final positioning of the stabilizing arrangement in the supporting element is effected by the suction element 62, which acts on the stabilizing arrangement 30 after the latter has been delivered by the feed means 61. The control element 21 assists the suction element in the correct directing of the stabilizing arrangement.

The plate 100 is thereupon turned one step in its direction of rotation and a container 10 is placed on the supporting element 20' by suitable feed means thus also being placed on the stabilizing container in the supporting element. The control element 21' ensures the correct orientation of the container. The gripper 40' is brought into position for closing the mouth portion of the container 10'.

The plate 100 is turned one step further. If necessary, pressure is then applied to the interior of the container. The roller 41" of the gripping element 40" is operated during the movement of the supporting plate 80 in such a manner that the container 10" is moved in the direction of the supporting element 20". The stabilizing arrangement 30" is thus acted on by the container 10" in such a manner that the stabilizing arrangement and the container assume correct positions relative to one another for the subsequent welding.

The plate 100 is now turned one step further. The mandrel 51 on the element 50 for the supply of energy, for example, for ultrasonic welding, is moved upwards towards the middle portion of the bottom of the stabilizing arrangement 30'''. Energy, for example ultrasound, is supplied by the mandrel and the material in the middle portion of the bottom of the stabilizing arrangement, and also the corresponding parts in the bottom of the container, are heated and the container is thereby welded to the stabilizing arrangement. The mandrel 51 then returns to its position below the plate 100.

The plate 100 is now moved one more step. The mandrel 53 of the cooling means 52 then assumes a position in which it lies against the middle portion of the bottom of the stabilizing arrangement 30 and thus cools the material in this region and also in the region of the middle portion of the bottom of the container. This cooling lasts until the necessary strength has been achieved in the bond between the stabilizing arrangement and the container.

The plate 100 is moved one step further, the roller 41 on the gripping element 40 thus being feed from engagement with the supporting plate 80. The application of pressure to the interior of the container, in cases where pressure is applied, then ceases. The gripping element can thus return to its starting position. The container together with the stabilizing arrangement welded to it is released for removal from the production unit. This can be achieved for example with the aid of an ejection device or with the aid of a suction pipe 70.

With the construction described, a number of positions may be provided for the supporting element 20 between the position for cooling the welding region and the position for removal from the production unit. These positions may, for example, be utilized for inspecting the products and also for ejecting any products which do not pass this inspection.

The arrangement described also makes it possible for a central control system for the sequence of production operation to be provided, for example, with the aid of a microdator. The latter attends to all the control functions and pulses necessary for enabling the operating elements to make the movements necessary for the sequence of operations.

In some applications, the outer ring 22 may have a fixed orientation in relation to the plate 100. This arrangement is expedient when the additional security provided through the movable suspension of the outer ring 22 in respect of the orientation of the bottom of the container in relation to the stabilizing arrangement is not necessary.

The foregoing describes an arrangement operating in accordance with the principle of the invention and consisting of a number of working stations which are positioned on plate 100, which performs a circular movement during the course of the operation. It is obvious that the invention is not restricted to the use of an apparatus arranged in this manner, but may also be applied with a more or less linear movement of production elements. In accordance with the principle of the invention, it is equally possible for the separate production stations to be fixed in psition and for the containers and supporting elements to be moved between the various production stations. A combination of the two alternative arrangements may be found economical in certain cases.

A further advantage of the invention is that when the stabilizing arrangement is festened to the container the stabilizing arrangement is assured of accurate orientation in relation to the vertical axis of the container. Problems in connection with the filling of the container are thus overcome. Previously known foot constructions in which the foot clips on the container do not provide the accurate orientation achieved here.

What is claimed is:

1. Apparatus for welding a stabilizing arrangement of plastic material on a container of plastic material, said apparatus comprising supporting means for receiving and carrying a stabilizing arrangement to be welded to the bottom of a container, gripping means for pressing a container against the stabilizing arrangement in the supporting means, and ultrasonic welding means applicable to said stabilizing arrangement in the region where the stabilizing arrangement is in contact with the container, for welding the stabilizing arrangement to the container, said supporting means comprising an outer beaker-shaped ring corresponding to the outside dimensions of the stabilizing arrangement, and an inner tubular member including an end portion adapted for engaging the middle portion of the bottom of the stabilizing arrangement, said tubular member having an opening for slidably receiving the welding means so as to enable the welding means to bear against the middle portion of the bottom of the stabilizing arrangement.

2. Apparatus as claimed in claim 1 comprising cooling means for cooling the heated material after the welding thereof.

3. Apparatus as claimed in claim 2 comprising means for pressurizing the interior of the container during welding and cooling to stabilize the container.

4. Apparatus as claimed in claim 2 comprising mechanical support means for supporting the inner surface of the container in the region where the container is heated during both welding and subsequent cooling.

5. Apparatus as claimed in claim 6 wherein said supporting means further comprises a plate and spring means connecting said plate to said ring, means adjustably supporting said tubular member to said plate, so that when forces are applied to the edge of the stabilizing arrangement in the direction of the plate, the outer portions of the stabilizing arrangement can be displaced in relation to the middle portion of the bottom of the stabilizing arrangement lying against the tubular member.

6. Apparatus as claimed in claim 5 comprising a magazine for supporting a plurality of stabilizing arrangements and for feeding said arrangements individually to the supporting means.

7. Apparatus as claimed in claim 1 comprising control means for aligning the container in relation to the supporting means such that the container is supported by the supporting means.

8. Apparatus as claimed in claim 1 comprising suction means for removing the container with the stabilizing arrangement welded thereto from the supporting means on completion of the welding of the stabilizing arrangement to the container, said suction means including a tube through which the container and stabilizing arrangement welded thereto can travel.

9. Apparatus as claimed in claim 1 wherein said supporting means comprises a stepwise movable table on which the container is transported between a succession of stations, the container remaining stationary at said stations.

* * * * *